(12) United States Patent
Haukaas et al.

(10) Patent No.: US 8,992,156 B2
(45) Date of Patent: Mar. 31, 2015

(54) CONVEYOR FOR HOPPER BOTTOM TRANSPORTATION VEHICLE

(71) Applicant: Haukaas Manufacturing Limited, Mortlach (CA)

(72) Inventors: Greg Haukaas, Mortlach (CA); Beric Duane Haukaas, Mortlach (CA); Vincent Colistro, Saskatoon (CA)

(73) Assignee: Haukaas Manufacturing Limited, Mortlach, SK (CA)

( * ) Notice: Subject to any disclaimer, the term of this patent is extended or adjusted under 35 U.S.C. 154(b) by 128 days.

(21) Appl. No.: 13/934,955

(22) Filed: Jul. 3, 2013

(65) Prior Publication Data

US 2014/0014463 A1    Jan. 16, 2014

Related U.S. Application Data

(60) Provisional application No. 61/670,812, filed on Jul. 12, 2012.

(51) Int. Cl.
*B65G 41/00*    (2006.01)

(52) U.S. Cl.
CPC ............ *B65G 41/008* (2013.01); *B65G 41/002* (2013.01)
USPC ........... 414/558; 414/523; 414/545; 414/549; 198/317; 198/318

(58) Field of Classification Search
CPC ............................ B65G 41/008; B65G 41/002
USPC ........... 198/317, 318; 414/523, 545, 558, 549
See application file for complete search history.

(56) References Cited

U.S. PATENT DOCUMENTS

| | | | | |
|---|---|---|---|---|
| 2,293,486 | A * | 8/1942 | Barrett | 414/523 |
| 2,564,020 | A * | 8/1951 | Mengel | 414/523 |
| 3,811,602 | A * | 5/1974 | Holland | 222/627 |
| 3,866,770 | A * | 2/1975 | Palmer | 414/520 |
| 4,389,150 | A * | 6/1983 | Stenlund | 414/505 |
| 4,586,865 | A * | 5/1986 | Hansen | 414/519 |
| 5,718,556 | A * | 2/1998 | Forsyth | 414/503 |
| 6,814,532 | B1 * | 11/2004 | Thompson et al. | 414/502 |
| 2003/0156933 | A1 * | 8/2003 | Arne et al. | 414/502 |

* cited by examiner

*Primary Examiner* — Gene Crawford
*Assistant Examiner* — Thomas Randazzo
(74) *Attorney, Agent, or Firm* — Adrian D. Battison; Ade & Company Inc

(57) ABSTRACT

A conveyor is arranged to be mounted underneath a hopper bottom highway transportation truck which has two longitudinally spaced dump hoppers each with a bottom discharge opening to carry the discharged material to the side of the trailer from each of the hoppers in turn. The conveyor is thus carried between the bottom discharge openings so that it can be raised up between them during transport. From the mounting point at one side between the openings the conveyor is lowered so that its loading end is lowered and then the conveyor pivots to one side or the other so that its loading end is underneath the selected bottom discharge opening. The conveyor runs in a direction so that it lifts the material from the selected discharge opening upwardly to the mounting point at the one side for discharge to the side.

20 Claims, 5 Drawing Sheets

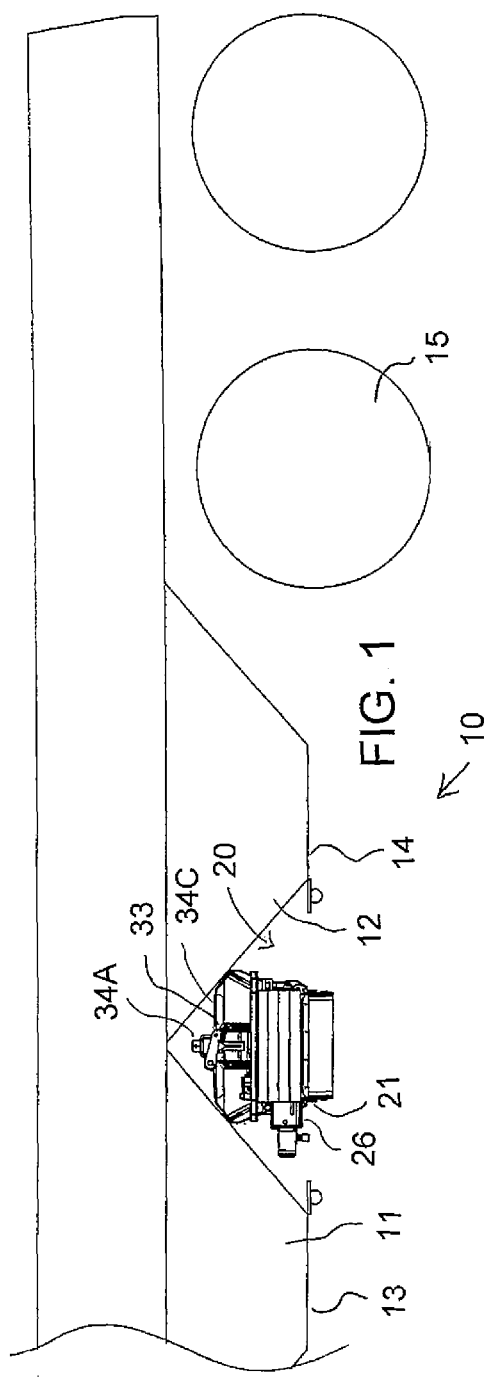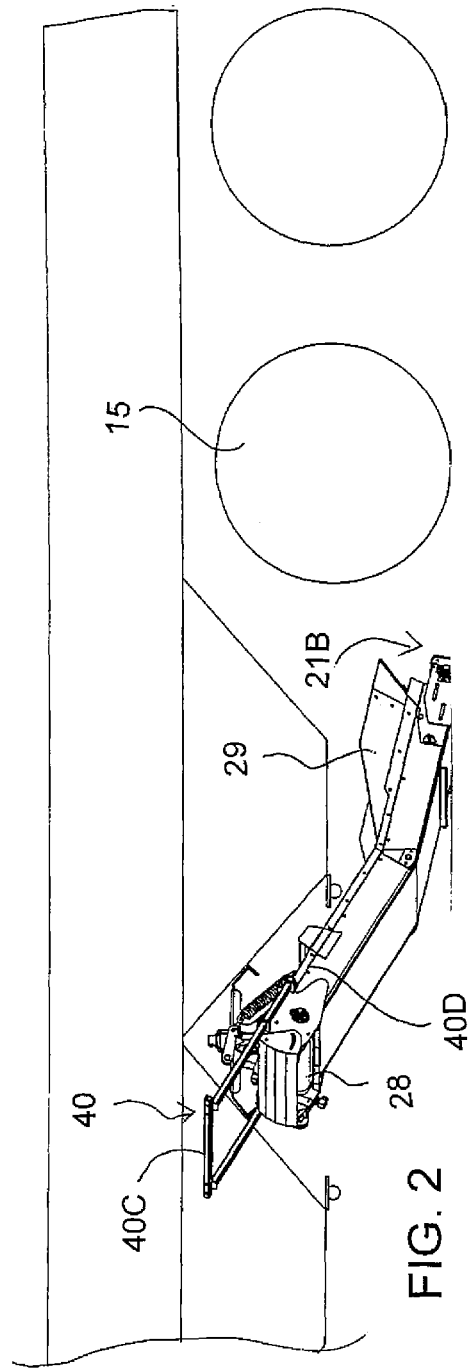

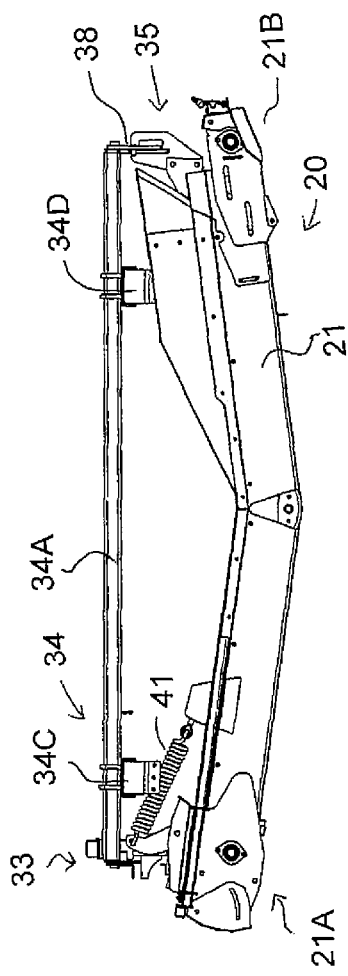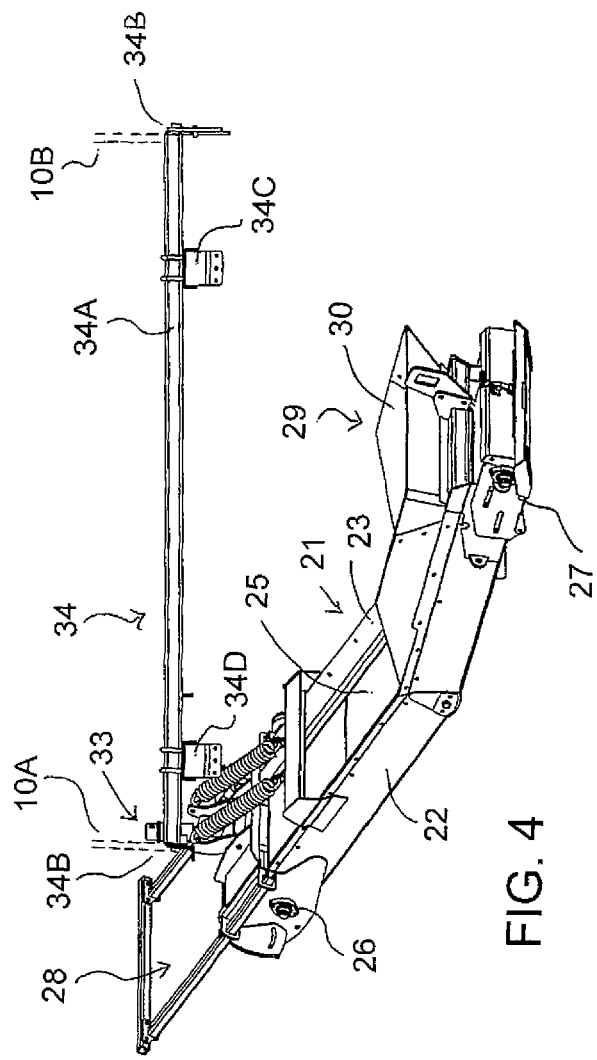

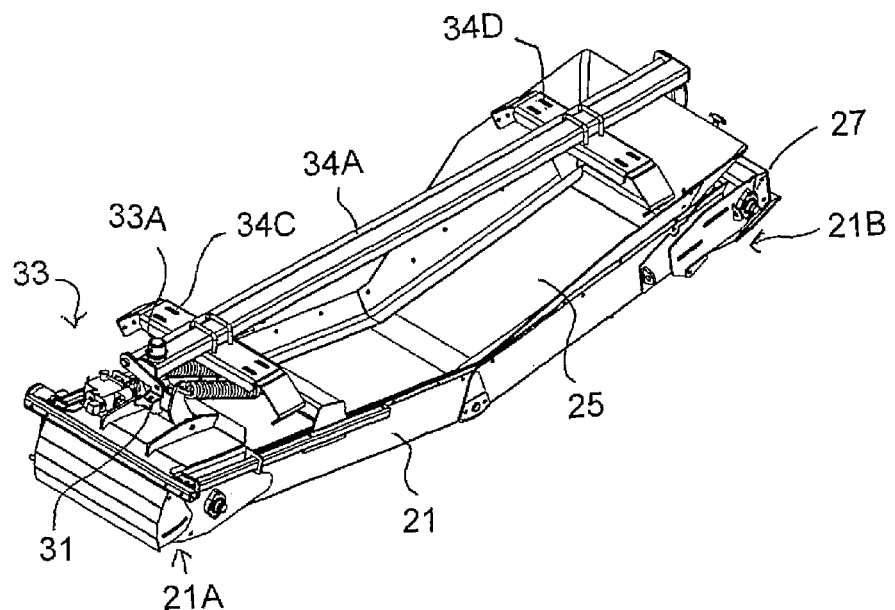
FIG. 7
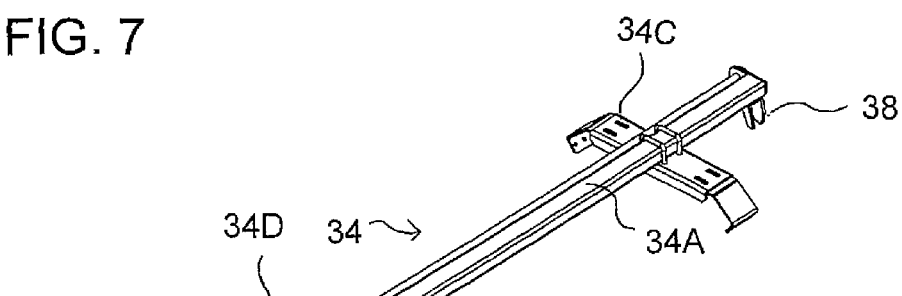
FIG. 8
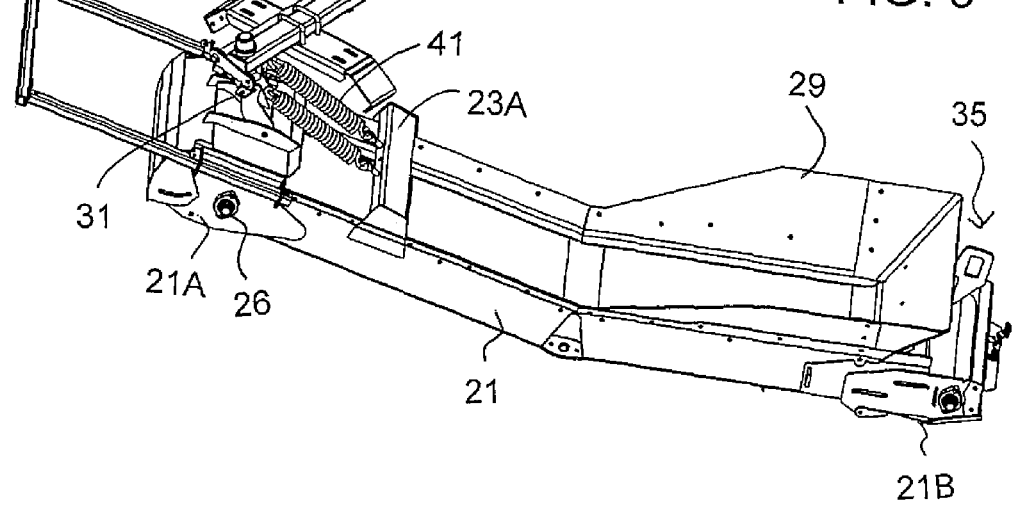

CONVEYOR FOR HOPPER BOTTOM TRANSPORTATION VEHICLE

This application claims the benefit under 35 USC 119 (e) of Provisional Application 61/670,812 filed Jul. 12, 2012.

This invention relates to a conveyor arranged to be mounted underneath a hopper bottom transportation vehicle with two dump hoppers and pivotal to two different positions to carry the discharged material to the side of the vehicle from each of the hoppers in turn.

U.S. Pat. No. 2,564,020 (Mengel) issued Aug. 14, 1951 discloses a conveyor carried on a carriage which moves along the trailer to the different discharge outlets.

U.S. Pat. No. 4,586,865 (Hansen) issued May 6, 1986 discloses a conveyor mounted at the discharge of the hopper and rotatable about a vertical axis at the discharge.

These arrangements are concerned with the same problem as that of the present invention but provide an unsatisfactory solution and could not be used with current equipment.

The present invention is particularly concerned with discharge of seed from the hoppers of a highway trailer for loading a seeder so that protection of the product discharged from the hoppers to avoid wastage is a particular concern. However the conveyor can be used for discharging any particular flowable product from the hopper bottoms of any transport vehicle.

SUMMARY OF THE INVENTION

It is one object of the present invention to provide a conveyor arranged to be mounted underneath a hopper bottom vehicle transportation vehicle with two dump hoppers to carry the discharged material to the side of the vehicle from each of the hoppers in turn.

According to one aspect of the invention there is provided a conveyor arranged to be mounted underneath a hopper bottom transportation truck vehicle which has two longitudinally spaced dump hoppers each with a bottom discharge opening, the conveyor being arranged to carry the discharged material to the side of the trailer from each of the hoppers in turn, the conveyor comprising:

a conveyor frame arranged for mounting on the vehicle;

a conveyor mechanism on the frame having a discharge at a first end of the frame and a feed receptacle at a second end of the frame;

a mounting arrangement for mounting of the first end of the frame at or adjacent a first side of the transport vehicle at a position between the two hoppers;

an attachment assembly for releasable attachment of the second end of the frame at or adjacent a second side of the transport vehicle at a position between the two hoppers;

such that in a transport position the frame extends across the vehicle and is carried by the mounting arrangement and the attachment assembly in a position between the two hoppers extending across the vehicle;

the attachment assembly being arranged to release the second end of the frame to lower from the vehicle to the ground;

the mounting arrangement being arranged to allow up and down pivotal movement of the frame so as to allow the second end to raise and lower to the ground;

the mounting arrangement being arranged to allow pivotal movement of the frame about a generally upright axis at the first side;

such that in a first operating position the frame pivots so that the feed receptacle is located underneath a first one of the bottom discharge openings;

and such that in a second operating position the frame pivots so that the feed receptacle is located underneath a second one of the bottom discharge openings.

Preferably the frame is arranged in the operating positions such that the conveyor runs in a direction so that it lifts the material from the selected discharge opening upwardly to the mounting point at the first side for discharge to the side of the vehicle.

Preferably the frame is horizontal in the transport position and the frame extends to a height no lower than the bottom of the discharge hoppers in the transport position. It is necessary in highway trailers for which the present arrangement is particularly designed that the ground clearance defined by the bottom of the hoppers is not compromised by low hanging elements. Thus the present arrangement, as determined by the inventor can extend across between the two hoppers without presenting any low hanging obstacle. The length which matches the width of the vehicle also allows the feed receptacle at the second end to reach to the two hoppers only by pivotal movement of the frame about the mounting at the first side.

The second end of the frame can include an optional a ground wheel or other element which allows the required movement in an arc around the generally upright axis. However the movement can also be effected by a lifting handle which takes sufficient weight to avoid the necessity for a wheel.

Preferably the second end of the frame is lifted manually and there is provided a spring assist for providing an assisting lifting force lifting the second end of the frame. However a winch or other lift arrangement can also be provided.

Preferably the feed receptacle comprises a hopper.

Preferably the conveyor is a belt but other arrangements such as an auger can be used.

Preferably the conveyor is arranged so that the discharge is located at the first side underneath the mounting arrangement so as to discharge at the side of the vehicle with no extension portion. Typically this discharge directly at the side can fall direction into a feed conveyor of an air seeder without providing any extensions of either the conveyor itself or that of the air seeder. This allows a conventional simple air seeder conveyor to be used which simply moves to one side of the air seeder and avoids the hopper of the conveyor from being located underneath the vehicle where it can be damaged if suitable care is not taken.

The conveyor is thus carried between the bottom discharge openings so that it can be raised up between them during transport.

From the mounting point at one side between the openings the conveyor is lowered so that its loading end is lowered to a transport wheel and then the conveyor pivots to one side or the other so that its loading end is underneath the selected bottom discharge opening.

The conveyor runs in a direction so that it lifts the material from the selected discharge opening upwardly to the mounting point at the one side for discharge to the side.

The prior art does not operate in this way and could NOT operate with modern hopper bottom highway transportation trucks.

One embodiment of the invention will now be described in conjunction with the accompanying drawings in which:

BRIEF DESCRIPTION OF THE DRAWINGS

FIG. 1 is a side elevational view of a hopper bottom highway transportation vehicle including one embodiment of a conveyor according to the present invention shown in the transport position.

FIG. 2 is a side elevational view of the vehicle and conveyor of FIG. 1 in the operating position.

FIG. 3 is a rear elevational view of the conveyor of FIG. 1 in the transport position.

FIG. 4 is a rear elevational view of the conveyor of FIG. 1 in the operating position.

FIG. 7 is an isometric view of the conveyor of FIG. 1 in the transport position.

FIG. 8 is an isometric view of the conveyor of FIG. 1 shown in the operating position

DETAILED DESCRIPTION

Figure 5:
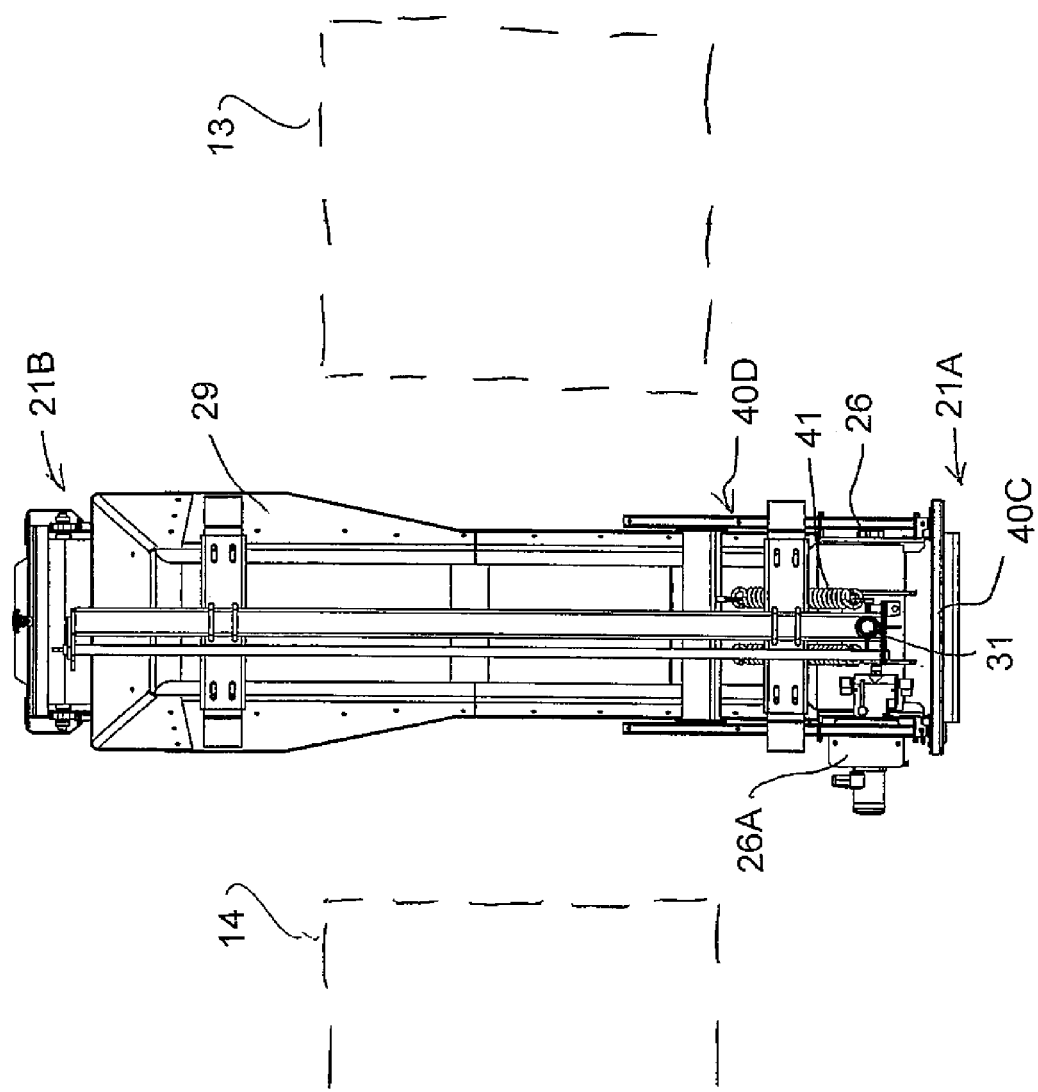
FIG. 5 is a top plan view of the conveyor of FIG. 1 in the operating position at one hopper.

In the figures is shown a hopper bottom highway transportation vehicle 10 which has two longitudinally spaced dump hoppers 11 and 12 each with a bottom discharge opening 13, 14 mounted on ground wheels 15 for transportation from a supply location to a discharge location. The vehicle is shown as a trailer but can be self-propelled. The vehicle is shown for highway use but can be a farm type vehicle.

A conveyor 20 is arranged to be mounted underneath the vehicle between the two hoppers 11 and 12.

The conveyor includes a conveyor frame 21 defined by side members 22 and end cross members 23 so as to provide a rigid structure arranged for mounting on the vehicle.

A conveyor belt 25 is carried on the frame by rollers 26, 27 and is driven longitudinally of the frame to define a discharge 28 at a first end 21A of the frame and a feed receptacle 29 or hopper with walls 30 at a second end 21B of the frame 21.

A mounting arrangement 34 comprises a rail 34A which extends transversely across the vehicle from a first end 34B at one side rail 10A of the vehicle to a second end 34C at the opposed side rail 10B of the vehicle. The rail 34 is carried on straps 34C and 34D connected between the hoppers 11 and 12 so as to hold the rail 34 at a position between the hopper at a position below the main fame of the vehicle. The straps can be arranged to allow movement of the rail 34A longitudinally of the vehicle so as to change the distance of the rail relative to the hoppers to move closer to a selected one of the two hoppers.

The rail 34A includes a first mounting arrangement 33 at one end which carries the end of the conveyor frame. The mounting arrangement 33 allows up and down pivotal movement of the conveyor frame 21 by a hanger 31 so as to allow the second end 21B of the frame to raise and lower to the ground. The mounting arrangement 33 includes an upright pin 33A on the hanger 31 to allow pivotal movement of the frame about a generally upright axis defined by the pin 33A.

A second attachment arrangement 35 attaches the second end 21B of the frame at or adjacent a second side 10B of the transport vehicle at a position between the two hoppers. The straps 34C and 35D have couplings to allow the whole system to be removed. The attachment 35 includes a latch 38 to allow the second end to be held up between the hoppers in the transport position and to be released to be lowered in the operating position.

In the transport position the conveyor frame 21 extends across the vehicle and is carried by the mounting arrangement 34 and the attachment assembly in a position between the two hoppers extending across the vehicle.

Figure 6:
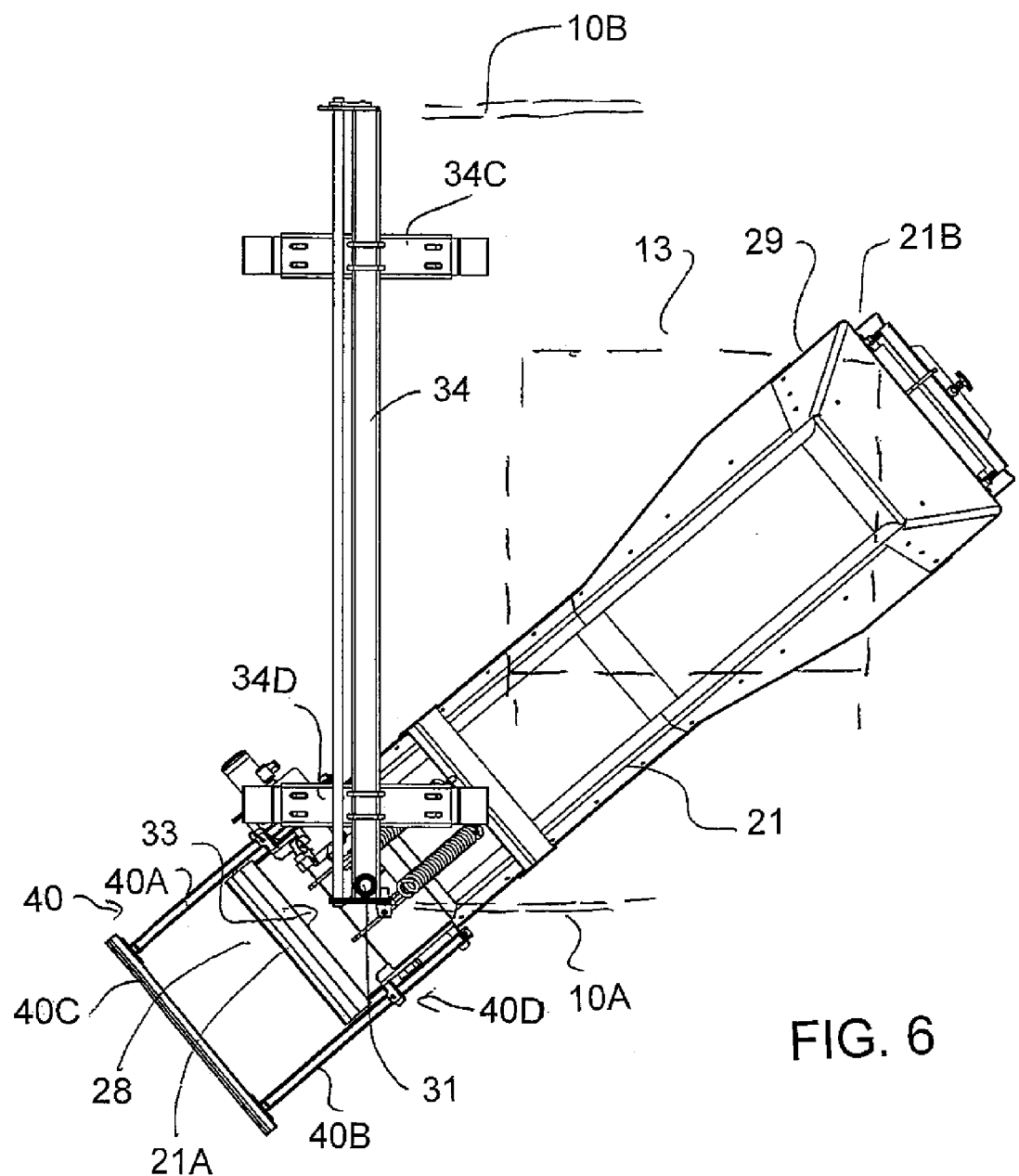
FIG. 6 is a top plan view of the conveyor of FIG. 1 in the transport position.

In the first operating position shown in FIG. 6 the frame pivots so that the feed receptacle 29 is located underneath a first one 13 of the bottom discharge openings and in a second operating position the frame 21 pivots so that the feed receptacle 29 is located underneath a second one 14 of the bottom discharge openings.

In the operating positions the conveyor runs as drive by a motor 26A on the roller 26 in a direction so that it lifts the material from the selected discharge opening 13, 14 upwardly from the receptacle 29 to the mounting point 33 at the first side 10A for discharge through discharge 28 to the side of the vehicle.

In the transport position the frame 21 is horizontal and extends to a height no lower than the bottom of the discharge hoppers 13, 14 in the transport position.

The second end 21B of the frame 21 may include a ground wheel for rolling in an arc around the generally upright axis defined by the pin 33. A handle 40 defined by two arms 40A, 40B and a cross member 40C is provided at the first end 21A of the frame and is retractable into a receptacle 40D along the sides of the frame 21. In the extended position the handle allows the frame 21 to be manually tilted up and down about the mounting arrangement 33 to raise and lower the second end 21B.

The second end 21B of the frame when released from the latch 38 is lifted manually back to close the latch 38 and there is provided a spring assist defined by a spring arrangement 41 connected between the hanger 31 and a cross member 23A of the frame 21 for providing an assisting lifting force lifting the second end 21B of the frame to assist the manual effort required for lifting.

In the operating position, the conveyor is arranged so that the discharge 28 is located at the first side 10A underneath the mounting arrangement 33 so as to discharge at the side 10A of the vehicle with no extension portion into a feed hopper 50 of a conveyor.

The conveyor arrangement therefore is carried on the vehicle in a convenient manner between the two hoppers without projecting outwardly beyond the sides 10A and 10B and without depending below the bottom of the hoppers 11 and 12. The single conveyor can then be deployed by lowering the second end to the ground and by swiveling the conveyor to one side or the other to take up her position where the hopper 29 underlies the hopper bottom of a selected one of the transport containers on the vehicle. In most hopper bottom vehicles of this type the geometry is conveniently arranged so that the swiveling of the conveyor to the diagonal operating position causes the hopper 29 to move so that it underlies the hopper bottom 13, 14 which is half way across the vehicle. However in some cases where the spacing between the hopper bottoms 13, 14 is different, it is necessary to slide the mounting 33 along the vehicle by moving the rail on the straps 34C, 34D toward one of the hoppers. In this way the same conveyor arrangement can be used for vehicles of different dimensions of spacing between the hoppers.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

The invention claimed is:

1. A hopper bottom transportation vehicle comprising:
two longitudinally spaced dump hoppers each with a bottom discharge opening;
ground wheels for carrying the dump hoppers across the ground for delivery of a particulate flowable material;

and a conveyor arranged to be mounted underneath to carry the discharged material to the side of the vehicle from each of the hoppers in turn, the conveyor comprising:
a conveyor frame arranged for mounting on the vehicle;
a conveyor mechanism on the frame having a discharge at a first end of the frame and a feed receptacle at a second end of the frame;
a first mounting component for mounting the first end of the conveyor frame at or adjacent a first side of the vehicle at a position between the two hoppers;
a second attachment component assembly for releasable attachment of the second end of the conveyor frame at or adjacent a second side of the vehicle at a position between the two hoppers;
such that in a transport position the conveyor frame extends across the vehicle and is carried by the mounting arrangement and the attachment assembly in a position between the two hoppers extending across the vehicle;
the second attachment component being arranged to release the second end of the frame to lower from the vehicle to the ground;
the first mounting component being arranged to allow up and down pivotal movement of the conveyor frame so as to allow the second end to raise and lower to the ground;
the first mounting component being arranged to allow pivotal movement of the frame about a generally upright axis at the first side;
such that in a first operating position the conveyor frame pivots so that the feed receptacle is located underneath a first one of the bottom discharge openings;
and such that in a second operating position the conveyor frame pivots so that the feed receptacle is located underneath a second one of the bottom discharge openings.

2. The vehicle according to claim 1 wherein the conveyor frame is arranged in the operating positions such that the conveyor runs in a direction so that it lifts the material from the selected discharge opening upwardly to the first side for discharge to the side of the vehicle.

3. The vehicle according to claim 1 wherein the conveyor frame is carried by the first mounting component such that the conveyor frame is horizontal in the transport position.

4. The vehicle according to claim 1 wherein the conveyor frame is carried by the first mounting component such that the conveyor frame extends to a height no lower than the bottom of the discharge hoppers in the transport position.

5. The vehicle according to claim 1 wherein the second end of the conveyor frame is lifted manually and there is provided a spring assist for providing an assisting lifting force lifting the second end of the conveyor frame.

6. The vehicle according to claim 1 wherein the conveyor frame is lifted by a handle at the first end.

7. The vehicle according to claim 1 wherein the feed receptacle comprises a hopper.

8. The vehicle according to claim 1 wherein the conveyor is a belt.

9. The vehicle according to claim 1 wherein the conveyor is arranged so that the discharge is located at the first side underneath the first mounting component so as to discharge at the side of the vehicle with no extension portion.

10. The vehicle according to claim 1 wherein the first mounting component includes a third mounting component at the first end of the conveyor frame for moving the first end longitudinally of the vehicle.

11. A conveyor arranged to be mounted underneath a hopper bottom transportation vehicle which has two longitudinally spaced dump hoppers each with a bottom discharge opening, the conveyor being arranged to carry the discharged material to the side of the trailer from each of the hoppers in turn, the conveyor comprising:
a conveyor frame arranged for mounting on the vehicle;
a conveyor mechanism on the frame having a discharge at a first end of the frame and a feed receptacle at a second end of the frame;
a mounting arrangement for mounting the conveyor frame on the vehicle;
the mounting arrangement including a first mounting component arranged for mounting the first end of the conveyor frame at or adjacent a first side of the transport vehicle at a position between the two hoppers;
the mounting arrangement including a second attachment component arranged for releasable attachment of the second end of the conveyor frame at or adjacent a second side of the transport vehicle at a position between the two hoppers;
such that in a transport position the conveyor frame is carried so as to extend between the first mounting component and the second attachment component so as to extend therebetween across the vehicle and in a position between the two hoppers;
the second attachment component being arranged to release the second end of the frame to lower from the second attachment component to the ground;
the first mounting component being arranged to allow up and down pivotal movement of the conveyor frame so as to allow the second end to raise and lower to the ground;
the first mounting component being arranged to allow pivotal movement of the conveyor frame about a generally upright axis at the first mounting component.

12. The conveyor according to claim 11 wherein the conveyor frame is arranged in the operating positions such that the conveyor runs in a direction so that it lifts the material from the second end upwardly to the discharge at the side of the vehicle.

13. The conveyor according to claim 11 wherein the conveyor frame is carried by the first mounting component such that the conveyor frame is horizontal between the first mounting component and the second attachment component.

14. The conveyor according to claim 11 wherein the conveyor frame is carried by the first mounting component such that the conveyor frame extends to a height no lower than the bottom of the discharge hoppers in the transport position.

15. The conveyor according to claim 11 wherein the second end of the conveyor frame is lifted manually and there is provided a spring assist for providing an assisting lifting force lifting the second end of the conveyor frame.

16. The conveyor according to claim 15 wherein the conveyor frame is lifted by a handle at the first end.

17. The conveyor according to claim 11 wherein the feed receptacle comprises a hopper.

18. The conveyor according to claim 11 wherein the conveyor is a belt.

19. The conveyor according to claim 11 wherein the conveyor is arranged so that the discharge is located at the first side underneath the mounting arrangement so as to discharge at the side of the vehicle with no extension portion.

20. The conveyor according to claim 11 wherein the mounting assembly includes a third mounting component at the first end of the conveyor frame for moving the first end longitudinally of the vehicle.

* * * * *